United States Patent
Wang et al.

(10) Patent No.: US 11,557,120 B2
(45) Date of Patent: Jan. 17, 2023

(54) VIDEO EVENT RECOGNITION METHOD, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Qi Wang, Beijing (CN); Zhifan Feng, Beijing (CN); Hu Yang, Beijing (CN); Feng He, Beijing (CN); Chunguang Chai, Beijing (CN); Yong Zhu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 6 days.

(21) Appl. No.: 17/350,731

(22) Filed: Jun. 17, 2021

(65) Prior Publication Data
US 2022/0036085 A1 Feb. 3, 2022

(30) Foreign Application Priority Data
Jul. 29, 2020 (CN) .......................... 202010745261.1

(51) Int. Cl.
*G06V 20/40* (2022.01)
*G06V 40/16* (2022.01)
(Continued)

(52) U.S. Cl.
CPC .............. *G06V 20/41* (2022.01); *G06K 9/62* (2013.01); *G06V 10/426* (2022.01); *G06V 20/46* (2022.01);
(Continued)

(58) Field of Classification Search
CPC ...... G06V 20/41; G06V 20/46; G06V 40/172; G06V 10/426; G06K 9/62
See application file for complete search history.

(56) References Cited

U.S. PATENT DOCUMENTS 10,339,420 B1 * 7/2019 Lecue .................... G06V 10/75
2014/0324864 A1 10/2014 Choe et al.
(Continued)

FOREIGN PATENT DOCUMENTS

JP   2000172724 A   6/2000
WO   WO2019078164 A1   12/2020

OTHER PUBLICATIONS

Extended European Search Report of European patent application No. 21179704.8 dated Dec. 1, 2021, 13 pages.
(Continued)

*Primary Examiner* — David Perlman
(74) *Attorney, Agent, or Firm* — Brooks Kushman P.C.

(57) ABSTRACT

Technical solutions for video event recognition relate to the fields of knowledge graphs, deep learning and computer vision. A video event graph is constructed, and each event in the video event graph includes: M argument roles of the event and respective arguments of the argument roles, with M being a positive integer greater than one. For a to-be-recognized video, respective arguments of the M argument roles of a to-be-recognized event corresponding to the video are acquired. According to the arguments acquired, an event is selected from the video event graph as a recognized event corresponding to the video.

16 Claims, 5 Drawing Sheets

(51) Int. Cl.
  *G06V 10/426* (2022.01)
  *G06K 9/62* (2022.01)
  *G06V 30/10* (2022.01)
(52) U.S. Cl.
  CPC ............ *G06V 40/172* (2022.01); *G06V 20/44* (2022.01); *G06V 30/10* (2022.01)

(56) References Cited

U.S. PATENT DOCUMENTS

2020/0233864 A1* 7/2020 Jin .................... G06F 16/26
2020/0242155 A1 7/2020 Liu et al.

OTHER PUBLICATIONS

Yadav et al., "VEKG : Video Event Knowledge Graph to Represent Video Streams for Complex Event Pattern Matching," 2019 First International Conference On Graph Computing (GC), IEEE, Sep. 25, 2019 (Sep. 25, 2019), pp. 13-20, XP033738707, DOI: 10.1109/GC46384.2019.00011 [retrieved on Mar. 9, 2020].

Han et al., "Movie Question Answering via Textual Memory and Plot Graph", IEEE Transactions On Circuits and Systems for Video Technology, IEEE, USA, vol. 30, No. 3, Feb. 5, 2019 (Feb. 5, 2019), pp. 875-887, XP011776287, ISSN: 1051-8215, DOI: 10.1109/TCSVT.2019.2897604, [retrieved on Mar. 4, 2020].

Bauer et al., "Object-event graph matching for complex activity recognition", Cognitive Methods in Situation Awareness and Decision Support (COGSIMA), 2011 IEEE First International Multi-Disciplinary Conference On, IEEE, Feb. 22, 2011 (Feb. 22, 2011), pp. 88-93, XP031860349, DOI: 10.1109/COGSIMA.2011.5753759 ISBN: 978-1-61284-785-6.

Communication pursuant to Article 94(3) EPC of European patent application No. 21179704.8 dated Aug. 31, 2022, 5 pages.

* cited by examiner

VIDEO EVENT RECOGNITION METHOD, ELECTRONIC DEVICE AND STORAGE MEDIUM

CROSS-REFERENCE TO RELATED APPLICATIONS

This application claims the priority and benefit of Chinese Patent Application No. 202010745261.1, filed on Jul. 29, 2020, entitled "VIDEO EVENT RECOGNITION METHOD AND APPARATUS, ELECTRONIC DEVICE AND STORAGE MEDIUM". The disclosure of the above application is incorporated herein by reference in its entirety.

TECHNICAL FIELD

The present disclosure relates to computer application technologies, particularly to the fields of knowledge graphs, deep learning and computer vision, and more particularly to a video event recognition method, an electronic device and a storage medium.

BACKGROUND

With the explosion of video in the information age, video understanding becomes an important technical requirement, such as video event recognition (also referred to as video event understanding). The video event recognition is intended to understand deep content of a video and to achieve the purpose of understanding the deep content by analyzing and reasoning events in the video.

At present, video recognition is mostly video action recognition or video scene recognition, but there is no corresponding video event recognition method.

SUMMARY

The present disclosure provides a video event recognition method, an electronic device and a storage medium.

A video event recognition method includes:

constructing a video event graph, each event in the video event graph including: M argument roles of the event and respective arguments of the argument roles, M being a positive integer greater than one;

acquiring, for a to-be-recognized video, respective arguments of the M argument roles of a to-be-recognized event corresponding to the video; and selecting, according to the arguments acquired, an event from the video event graph as a recognized event corresponding to the video.

An electronic device includes:

at least one processor; and a memory in communication connection with the at least one processor; wherein the memory stores instructions executable by the at least one processor, and the instructions are executed by the at least one processor to enable the at least one processor to carry out the method as described above.

A non-transitory computer-readable storage medium including instructions, which, when executed by a computer, cause the computer to carry out the method as described above.

It should be understood that the content described in this part is neither intended to identify key or important features of embodiments of the present disclosure and nor intended to limit the scope of the present disclosure.

BRIEF DESCRIPTION OF THE DRAWINGS

The accompanying drawings are intended to better understand the solution and do not constitute limitations on the present disclosure. In the drawings.

DETAILED DESCRIPTION

Exemplary embodiments of the present disclosure are described below with reference to the accompanying drawings, including various details of the embodiments of the present disclosure to facilitate understanding, and should be considered as examples only. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

In addition, it is to be understood that the term "and/or" herein is merely an association relationship describing associated objects, indicating that three relationships may exist. For example, A and/or B indicates that there are three cases of A alone, A and B together, and B alone. In addition, the character "/" herein generally means that associated objects before and after it are in an "or" relationship.

Figure 1:
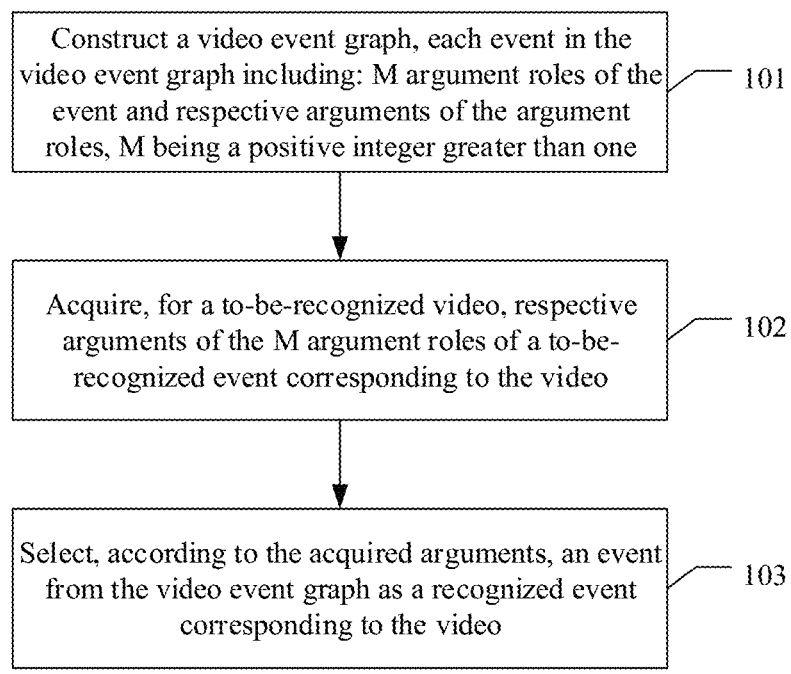
FIG. 1 is a flow chart of a video event recognition method according to an embodiment of the present disclosure.

FIG. 1 is a flow chart of a video event recognition method according to an embodiment of the present disclosure. As shown in FIG. 1, following specific implementations are included.

In 101, a video event graph is constructed, each event in the video event graph including: M argument roles of the event and respective arguments of the argument roles, M being a positive integer greater than one.

Different argument roles may be understood as different attributes of an event, and correspondingly, arguments may be understood as attribute values. If an argument role is "spatial scene", corresponding arguments may be "outdoor", "peach grove", and the like.

In 102, for a to-be-recognized video, arguments of the M argument roles of a to-be-recognized event corresponding to the video are acquired.

The to-be-recognized event refers to an event corresponding to the to-be-recognized video, and respective arguments of the M argument roles of the event can be acquired.

In 103, according to the arguments acquired, an event is selected from the video event graph as a recognized event corresponding to the video.

An event may be selected from the video event graph according to the arguments acquired. The event may serve as a recognized event corresponding to the video to be recognized, that is, an event recognition result of the to-be-recognized video.

It can be seen that in the above embodiment, a knowledge graph is combined with video understanding to construct a video event graph, in which an event includes a plurality of argument roles and their respective arguments, respective arguments of corresponding argument roles of a to-be-recognized event corresponding to a to-be-recognized video are acquired, and an event is selected from the video event graph according to the arguments acquired, so as to implement accurate and efficient video event recognition.

How to construct a video event graph is the prior art, and may be implemented by, for example, an automatic extraction and graph construction technology. The video event graph mainly defines and standardizes different events and main argument roles and arguments included in the events. As stated in 101, one event may include M argument roles. For example, the value of M may be 5, and the 5 argument roles may be: a spatial scene, an action, a person, an object and a related term respectively.

Taking an event of "Peach Garden Oath" as an example, argument roles and arguments included therein are as shown in Table 1:

TABLE 1 argument roles and arguments included in the event of "Peach Garden Oath"

| Argument role | Argument |
| --- | --- |
| Spatial scene | Outdoor, peach grove |
| Action | Weep, bow down |
| Person | Liu Bei, Guan Yu, Zhang Fei |
| Object | Table, peach tree, peach blossom, sky |
| Related term | Romance of the Three Kingdoms, brother, swear |

As stated in 102, for a to-be-recognized video, arguments of the M argument roles of a to-be-recognized event corresponding to the to-be-recognized video may be acquired, for example, an argument of the spatial scene argument role, an argument of the action argument role, an argument of the person argument role, an argument of the object argument role and an argument of the related term argument role of the to-be-recognized event may be acquired respectively.

Vision understanding may be performed on the to-be-recognized video to obtain an argument of the spatial scene argument role, an argument of the action argument role, an argument of the person argument role and an argument of the object argument role of the to-be-recognized event, and text understanding may be performed on a text corresponding to the to-be-recognized video to obtain an argument of the related term argument role of the to-be-recognized event.

The vision understanding mainly implements extraction and recognition of basic vision-related elements. Specifically, spatial scene recognition may be performed on the to-be-recognized video to obtain the argument of the spatial scene argument role of the to-be-recognized event, action recognition may be performed on the to-be-recognized video to obtain the argument of the action argument role of the to-be-recognized event, face recognition may be performed on the to-be-recognized video to obtain the argument of the person argument role of the to-be-recognized event, and generic object recognition may be performed on the to-be-recognized video to obtain the argument of the object argument role of the to-be-recognized event.

The spatial scene recognition may be used to recognize a spatial scene of the to-be-recognized video, and spatial scenes specifically included may be determined according to an actual requirement, as shown in Table 2:

TABLE 2

| Spatial scene |
| --- |
| bowling alley |
| campsite |
| forest |
| casino |
| bedroom |
| . . . |

The action recognition is used to recognize an action in the video. Actions specifically included may be determined according to an actual requirement, as shown in Table 3:

TABLE 3

| Action |
| --- |
| playing instruments |
| shaking hands |
| hugging |
| clapping |
| praying |
| burying |
| drinking |
| . . . |

The generic object recognition is used to recognize the name of an object in the video, such as a tree, a table, or the like. The face recognition is used to recognize a person in the video.

How to perform spatial scene recognition, action recognition, generic object recognition and face recognition are all prior arts.

In addition to the vision understanding, text understanding may also be performed on a text corresponding to the to-be-recognized video, so as to obtain the argument of the related term argument role of the to-be-recognized event. For example, entity recognition and keyword extraction may be performed on the text respectively, and an entity recognition result and a keyword extraction result are taken as the argument of the related word argument role of the to-be-recognized event.

The text corresponding to the to-be-recognized video may include, but is not limited to, one of the following or any combination: a title text of the to-be-recognized video, a description information (such as introduction information) text of the to-be-recognized video, a text obtained from audio conversion of the to-be-recognized video, a text obtained from subtitle conversion of the to-be-recognized video, and the like. A text corresponding to subtitles may be obtained by an Optical Character Recognition (OCR) technology, and a text corresponding to audio may be obtained by an Automatic Speech Recognition (ASR) technology.

The entity recognition refers to the recognition of an entity in the text, and the keyword extraction refers to the extraction of a keyword in the text. Specific implementations of the entity recognition and the keyword extraction are both prior arts.

Through the above processing, elements of different modes such as a video mode and a text mode are extracted, and then extracted multi-mode information can be fused to accurately recognize the event corresponding to the to-be-recognized video, that is, the accuracy of event recognition results is improved.

As stated in 103, according to the arguments acquired of the M argument roles of the to-be-recognized event, an event is selected from the video event graph as the recognized event corresponding to the to-be-recognized video.

Specifically, first, an event graph may be constructed according to the acquired argument, the event graph including three layers of nodes, the first layer includes one node corresponding to the to-be-recognized event, the second layer includes M nodes corresponds respectively to the argument roles, and the number of node in the third layer is equal to a sum of the number of the arguments of the M augment roles, and the nodes of the third layer corresponds respectively to the arguments, the nodes of the second layer are connected to the node of the first layer, and the nodes of the third layer are respectively connected to the nodes of the second layer corresponding to respective argument roles to which the nodes of the third layer correspond; then, a graph embedding representation corresponding to the event graph (i.e., a graph embedding representation corresponding to the to-be-recognized event) may be acquired, similarities between the graph embedding representation corresponding to the event graph and graph embedding representations corresponding to respective events of the video event graph may be calculated respectively, and the event with the maximum similarity may be taken as the recognized event. Since the to-be-recognized event is an unknown event, node content corresponding to the to-be-recognized event may be considered to be empty in practical application.

Figure 2:
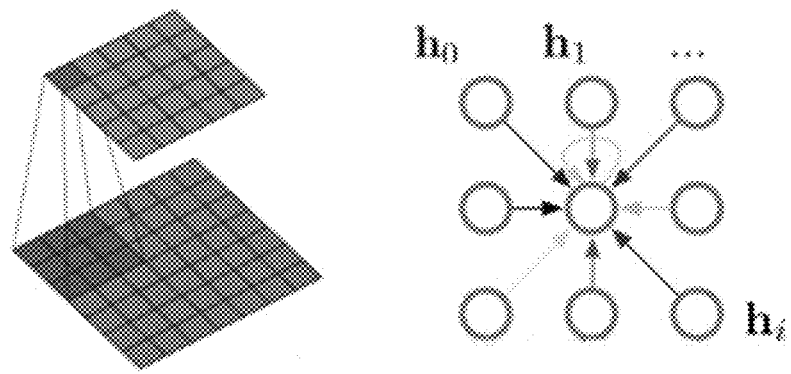
FIG. 2 is a first schematic diagram of a convolution operation according to an embodiment of the present disclosure.
Figure 3:
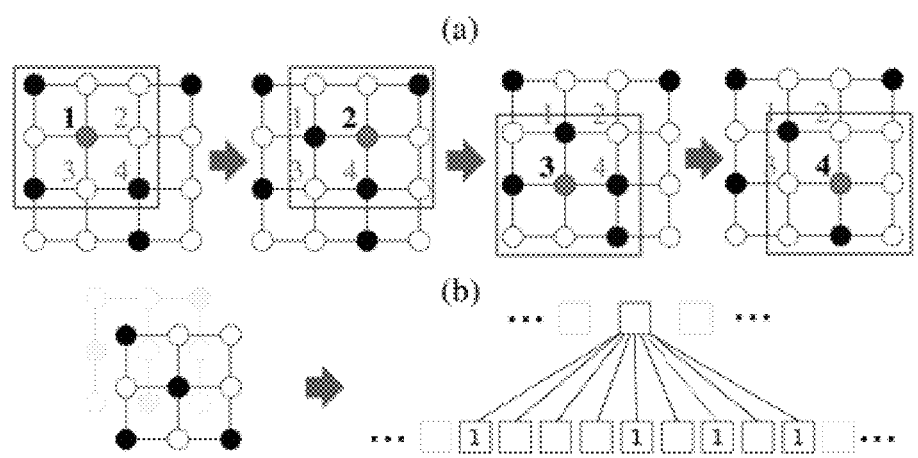
FIG. 3 is a second schematic diagram of a convolution operation according to an embodiment of the present disclosure.

In order to facilitate the understanding of a subsequent processing method, the application of Convolutional Neural Networks (CNNs) in images is introduced first. FIG. 2 is a first schematic diagram of a convolution operation according to an embodiment of the present disclosure. As shown in FIG. 2, the figure on the left represents a process of a convolution operation of an image in a neural network layer, the bottom layer is an input characteristic pattern (or original pattern), and a characteristic pattern after convolution is output through a convolution (which is a 3*3 convolution kernel here, i.e., receptive field=9) operation. FIG. 3 is a second schematic diagram of a convolution operation according to the present disclosure. As shown in FIG. 3, in each figure of Part (a), nine pixels at the bottom are weighted and mapped to one pixel at an upper level, each region with convolution can be regarded as a collection of a center node and its neighborhood nodes, which is finally weighted and mapped into a value. Therefore, the input characteristic pattern of Part (b) may be regarded as: determining some nodes in a square grid graph to represent this image and constructing a regularized neighborhood graph (the neighborhood graph is the region of the convolution kernel, that is, the receptive field).

Based on the above inspiration, in the present disclosure, when a graph embedding representation corresponding to the event graph is acquired, first, N center nodes may be selected from the nodes in the event graph, N being a positive integer greater than one and less than the number of the nodes included in the event graph; then, the following processing may be performed on each center node: acquiring a neighborhood node of the center node, the neighborhood node being a node connected to the center node, and determining a vector representation corresponding to a sub-graph composed of the center node and the neighborhood node; and the obtained vector representations may be input into a CNN to obtain the graph embedding representation corresponding to the event graph.

For the event graph, it is necessary to first determine a width N, which represents the number of center nodes to be selected, that is, the number of receptive fields. For example, nodes corresponding to four main argument roles may be selected as center nodes. For example, a node corresponding to the spatial scene argument role, a node corresponding to the action argument role, a node corresponding to the object argument role and a node corresponding to the related term argument role may be selected as the four center nodes.

Then, neighborhood nodes of the center nodes may be acquired respectively. That is, for each center node, node connected to the center node may be taken as the neighborhood nodes of the center node. Since the center node is a node of the second layer, the neighborhood nodes thereof include a node of the first layer and a node of the third layer.

In addition, regularization may be further performed. Specifically, for each center node, if the number P of the acquired neighborhood nodes of the center node is less than K, K−P dummy nodes may be added, K being a positive integer greater than one, and the added dummy nodes may also be taken as the neighborhood nodes of the center node. If the number P of the acquired neighborhood nodes of the center node is greater than K, the acquired neighborhood nodes of the center node may be sorted according to a predetermined rule, and the K+1th neighborhood node and the neighborhood nodes thereafter after sorting may be discarded.

A specific value of K may be determined according to an actual requirement. Taking the value of K being 4 as an example, for each center node, assuming that three neighborhood nodes are acquired, one dummy node is to be added. Assuming that six neighborhood nodes are acquired, the six neighborhood nodes need to be sorted, and fifth and sixth nodes are discarded. A default value may be set for the dummy node.

There is no restriction on how to sort the neighborhood nodes. For example, degrees of confidence of the neighborhood nodes may be obtained in a predetermined manner, and the neighborhood nodes are sorted in descending order according to the degrees of confidence. Generally, the node of the first layer in the neighborhood nodes may be retained, while part of the nodes of the third layer in the neighborhood nodes may be discarded.

For each center node, a vector representation corresponding to a sub-graph composed of the center node and neighborhood nodes thereof may be further determined. For example, the sub-graph may be mapped into a vector representation in a preset mapping manner. There is no restriction on the specific mapping method.

In this way, a corresponding vector representation may be obtained for each center node, and then the obtained vector representations may be input into a CNN, such as a two-layer CNN, so as to obtain the graph embedding representation corresponding to the event graph.

According to the same graph embedding representation acquisition method, graph embedding representations corresponding to events in the video event graph may be acquired respectively, similarities between the graph embedding representation corresponding to the event graph and the graph embedding representations corresponding to the events in the video event graph may be then calculated respectively, and an event with the maximum similarity may be taken as the selected event, that is, as the event corresponding to the to-be-recognized video.

Figure 4:
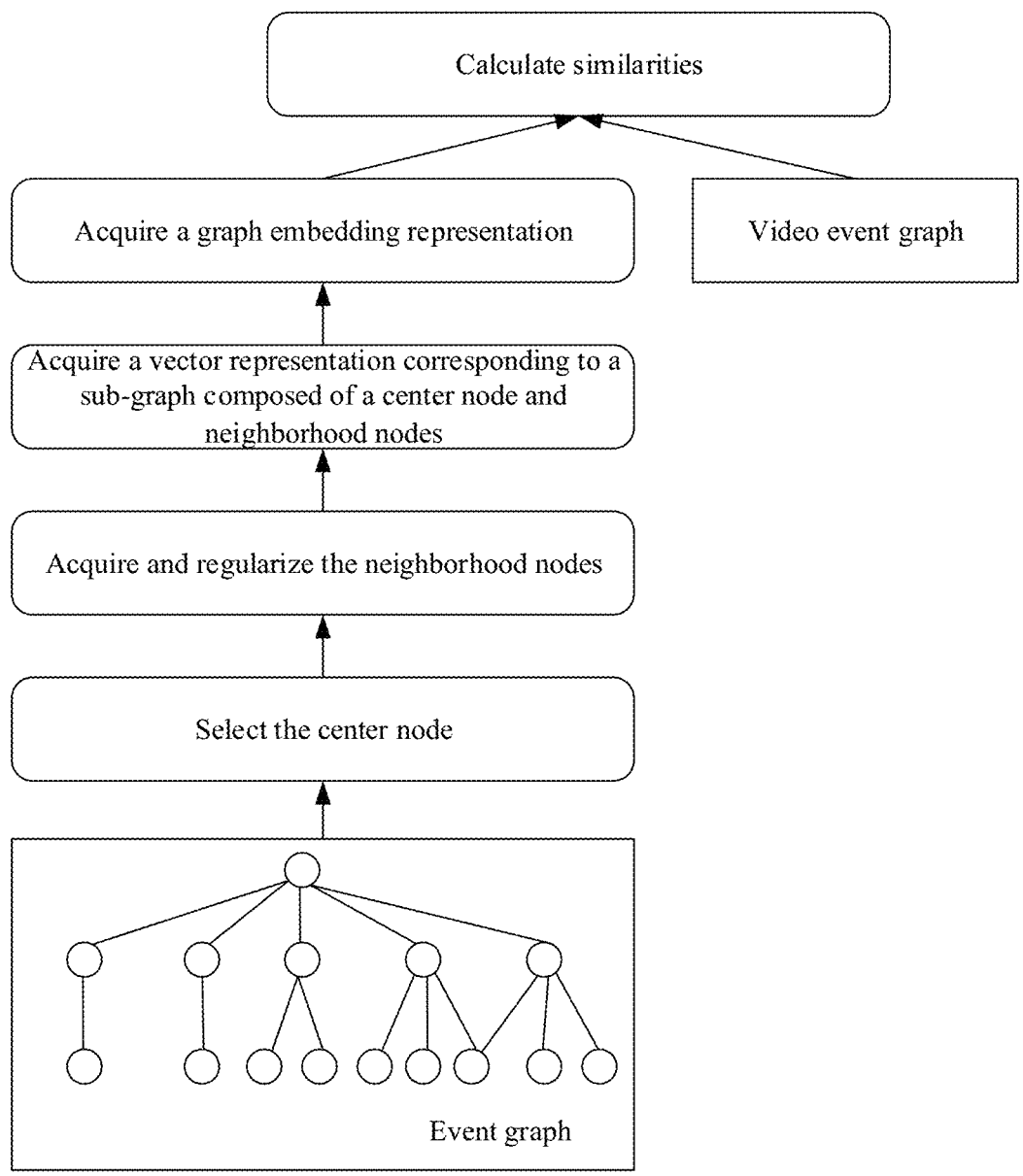
FIG. 4 is a schematic diagram of a process of acquiring a graph embedding representation corresponding to an event and calculating similarities according to an embodiment of the present disclosure.

Based on the above introduction, FIG. 4 is a schematic diagram of a process of acquiring a graph embedding representation corresponding to an event and calculating similarities according to an embodiment of the present disclosure. With reference to FIG. 4, the third node in the nodes of the second layer in the event graph is assumed to be selected as a center node, for example, neighborhood nodes thereof may include the node of the first layer and two nodes of the third layer connected to the center node. Assuming that the value of K is 4, one dummy node needs to be added.

In the above processing, graph embedding is applied to event knowledge representation, and a complex inference technology is constructed in combination with a CNN, and thus the accuracy of video event recognition results is improved.

Figure 5:
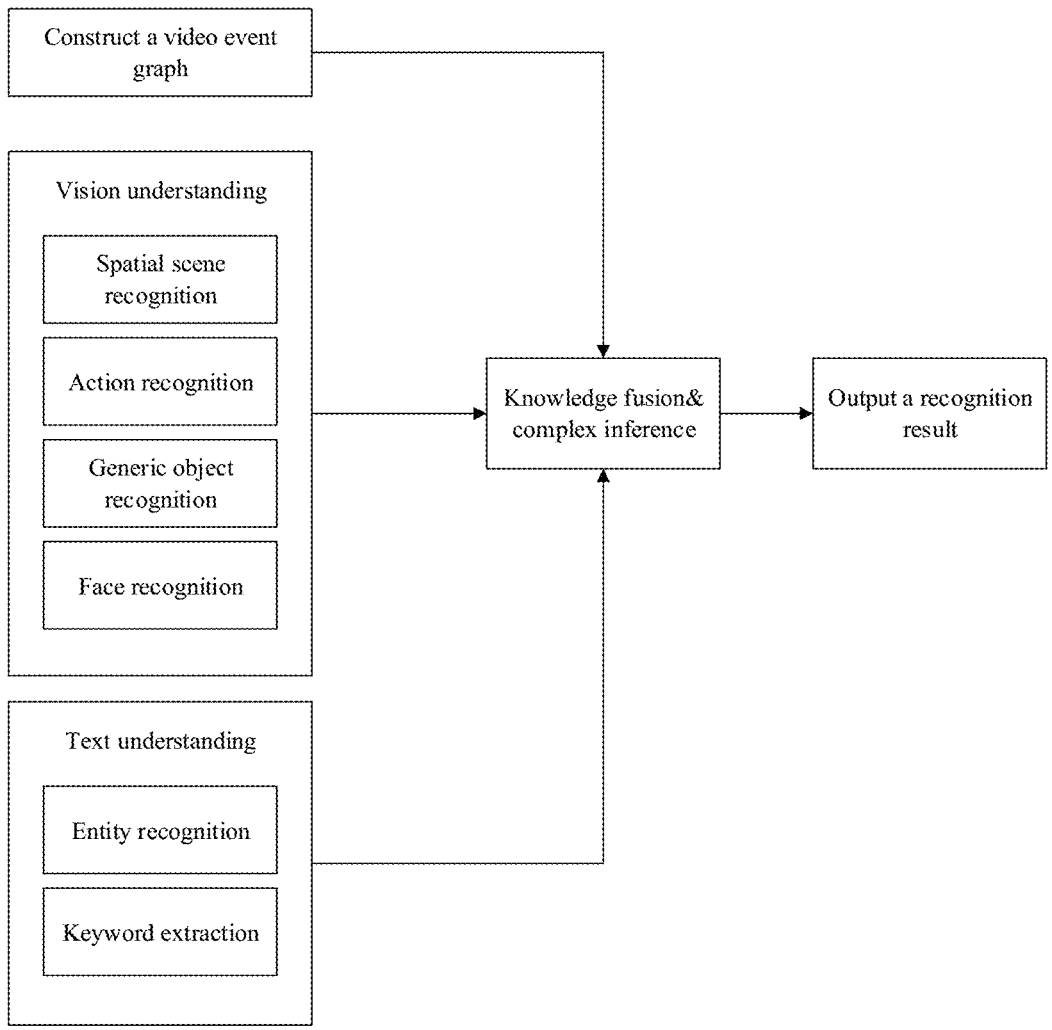
FIG. 5 is a schematic diagram of an overall implementation process of a video event recognition method according to an embodiment of the present disclosure.

FIG. 5 is a schematic diagram of an overall implementation process of a video event recognition method according to an embodiment of the present disclosure. As shown in FIG. 5, knowledge fusion and complex inference refer to a process of constructing an event graph according to arguments acquired, acquiring a corresponding graph embedding representation of the event graph and obtaining a final recognition result by calculating similarities between graph embedding representations.

It shall be noted that for ease of description, the foregoing method embodiment is described as a series of action combinations. However, those skilled in the art should understand that the embodiments of the present disclosure are not limited to the sequence of actions described, as some steps may be performed in another sequence or simultaneously according to the present disclosure. Next, those skilled in the art should also understand that the embodiments described in this specification are merely exemplary embodiments, and actions and modules involved are not necessarily mandatory to the present disclosure.

Application scenes of the solution in the present disclosure may be illustrated as follows:

1) A video search scene in which a video event may be marked for video search recall;

2) A video recommendation scene in which a user's point of interest may be associated with a video event for analysis, and video recommendation is performed correspondingly; and 3) A business-oriented (ToB) scene in which theft, fighting and other events may be recognized.

The above is an introduction to the method embodiment, and the following is a further description of the solution according to the present disclosure through an apparatus embodiment.

Figure 6:
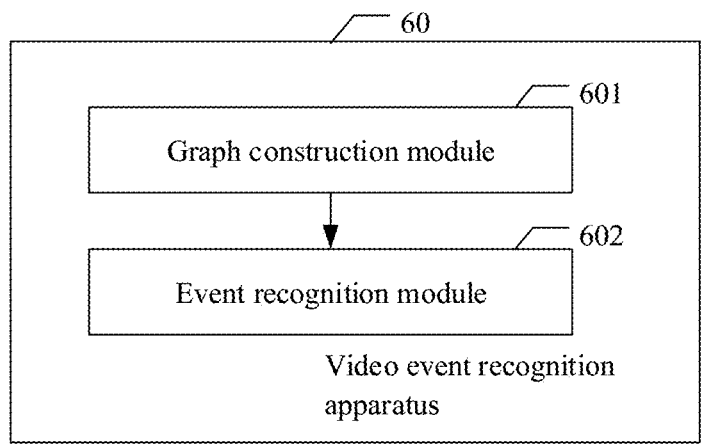
FIG. 6 is a schematic diagram of a composition structure of a video event recognition apparatus 60 according to an embodiment of the present disclosure.

FIG. 6 is a schematic diagram of a composition structure of an embodiment of a video event recognition apparatus 60 according to the present disclosure. As shown in FIG. 6, a graph construction module 601 and an event recognition module 602 are included.

The graph construction module 601 is configured to construct a video event graph, each event in the video event graph including: M argument roles of the event and respective arguments of the argument roles, M being a positive integer greater than one.

The event recognition module 602 is configured to acquire, for a to-be-recognized video, respective arguments of the M argument roles of a to-be-recognized event corresponding to the video, and select, according to the arguments acquired, an event from the video event graph as a recognized event corresponding to the video.

The M argument roles include: a spatial scene argument role, an action argument role, a person argument role, an object argument role and a related term argument role.

The event recognition module 602 may perform vision understanding on the to-be-recognized video to obtain an argument of the spatial scene argument role, an argument of the action argument role, an argument of the person argument role and an argument of the object argument role of the to-be-recognized event, and may perform text understanding on a text corresponding to the to-be-recognized video to obtain an argument of the related term argument role of the to-be-recognized event.

Specifically, the event recognition module 602 may perform spatial scene recognition on the to-be-recognized video to obtain the argument of the spatial scene argument role of the to-be-recognized event, perform action recognition on the to-be-recognized video to obtain the argument of the action argument role of the to-be-recognized event, perform face recognition on the to-be-recognized video to obtain the argument of the person argument role of the to-be-recognized event, and perform generic object recognition on the to-be-recognized video to obtain the argument of the object argument role of the to-be-recognized event.

The event recognition module 602 may further perform entity recognition and keyword extraction on the text corresponding to the to-be-recognized video to obtain the argument of the related term argument role of the to-be-recognized event.

The event recognition module 602 may construct an event graph according to the acquired argument, the event graph including three layers of nodes, wherein the first layer include one node corresponding to the to-be-recognized event, the second layer includes M nodes corresponding respectively to the argument roles, and the number of nodes of the third layer is equal to a sum of the number of the arguments of the M augment roles, and the nodes of the third layer corresponds respectively to the arguments, the nodes of the second layer are connected to the node of the first layer, and the nodes of the third layer are respectively connected to the nodes of the second layer corresponding to respective argument roles to which the nodes of the third layer correspond, may acquire a graph embedding representation corresponding to the event graph, and then may calculate respectively similarities between the graph embedding representation corresponding to the event graph and graph embedding representations corresponding to respective events of the video event graph respectively, and take the event with the maximum similarity as the recognized event.

Specifically, the event recognition module 602 may select N center nodes from the nodes in the event graph, N being a positive integer greater than one and less than the number of the nodes included in the event graph; may perform the following processing on each center node: acquiring neighborhood nodes of the center node, the neighborhood nodes being nodes connected to the center node, and determining a vector representation corresponding to a sub-graph composed of the center node and the neighborhood nodes; and input the obtained vector representations into a CNN to obtain the graph embedding representation corresponding to the event graph.

The event recognition module 602 may take a node corresponding to the spatial scene argument role, a node corresponding to the action argument role, a node corresponding to the object argument role and a node corresponding to the related term argument role as the center nodes.

For each center node, the event recognition module 602 may further, if the number P of the acquired neighborhood nodes of the center node is less than K, add K−P dummy nodes, K being a positive integer greater than one, and also taking the added dummy nodes as the neighborhood nodes of the center node; and if the number P of the acquired neighborhood nodes of the center node is greater than K, sort the acquired neighborhood nodes of the center node according to a predetermined rule, and discard the K+1th neighborhood node and the neighborhood nodes thereafter after sorting.

The specific workflow of the apparatus embodiment shown in FIG. 6 can be obtained with reference to the related description in the above method embodiment and is not repeated.

In conclusion, by use of the solution in the apparatus embodiment of the present disclosure, a knowledge graph is combined with video understanding to construct a video event graph, in which an event includes a plurality of argument roles and corresponding arguments respectively, arguments of corresponding argument roles of a to-be-recognized event corresponding to a to-be-recognized video are acquired, and an event is selected from the video event graph according to the arguments acquired, so as to implement accurate and efficient video event recognition. Elements of different modes such as a video mode and a text mode may be extracted, and extracted multi-mode information can be fused, so as to further improve the accuracy of event recognition results. In addition, graph embedding may be applied to event knowledge representation, and a complex inference technology is constructed in combination with a CNN, so as to further improve the accuracy of the event recognition results. Moreover, each module is highly decoupled and has strong expansibility.

According to embodiments of the present disclosure, the present disclosure further provides an electronic device and a readable storage medium.

Figure 7:
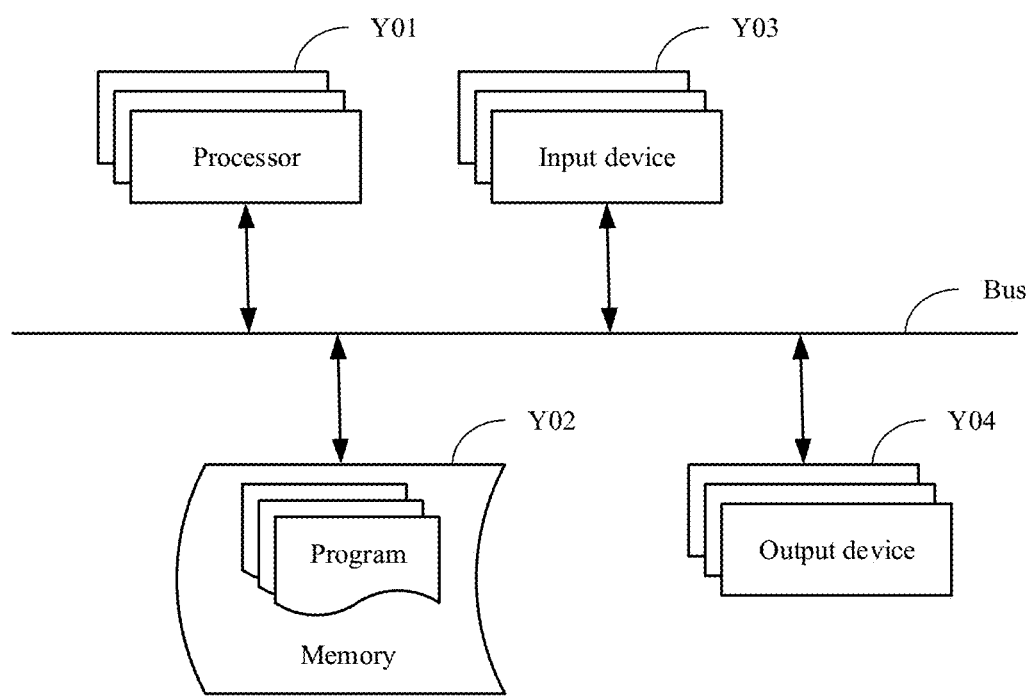
FIG. 7 is a block diagram of an electronic device for a method according to an embodiment of the present disclosure.

As shown in FIG. 7, it is a block diagram of an electronic device for a method according to an embodiment of the present disclosure. The electronic device is intended to represent various forms of digital computers, such as laptops, desktops, workbenches, personal digital assistants, servers, blade servers, mainframe computers and other suitable computers. The electronic device may further represent various forms of mobile devices, such as personal digital assistant, cellular phones, smart phones, wearable devices and other similar computing devices. The components, their connections and relationships, and their functions shown herein are examples only, and are not intended to limit the implementation of the present disclosure as described and/or required herein.

As shown in FIG. 7, the electronic device includes: one or more processors Y01, a memory Y02, and interfaces for connecting various components, including high-speed interfaces and low-speed interfaces. The components are connected to each other by using different buses and may be installed on a common motherboard or otherwise as required. The processor may process instructions executed in the electronic device, including instructions stored in the memory or on the memory to display graphical information of a graphical user interface on an external input/output device (such as a display device coupled to the interfaces). In other implementations, a plurality of processors and/or buses may be used together with a plurality of memories, if necessary. Similarly, a plurality of electronic devices may be connected, each of which provides some necessary operations (for example, as a server array, a set of blade servers, or a multiprocessor system). One processor Y01 is taken as an example is FIG. 7.

The memory Y02 is the non-instantaneous computer-readable storage medium according to the present disclosure. The memory stores instructions executable by at least one processor to make the at least one processor perform the method according to the present disclosure. The non-instantaneous computer-readable storage medium according to the present disclosure stores computer instructions. The computer instructions are used to make a computer perform the method according to the present disclosure.

The memory Y02, as a non-instantaneous computer-readable storage medium, may be configured to store non-instantaneous software programs, non-instantaneous computer executable programs and modules, for example, program instructions/modules corresponding to the method in the embodiment of the present disclosure. The processor Y01 runs the non-instantaneous software programs, instructions and modules stored in the memory Y02 to execute various functional applications and data processing of a server, that is, to implement the method in the above method embodiment.

The memory Y02 may include a program storage area and a data storage area. The program storage area may store an operating system and an application required by at least one function; and the data storage area may store data created according to use of the electronic device. In addition, the memory Y02 may include a high-speed random access memory, and may further include a non-instantaneous memory, for example, at least one disk storage device, a flash memory device, or other non-instantaneous solid-state storage devices. In some embodiments, the memory Y02 optionally includes memories remotely disposed relative to the processor Y01. The remote memories may be connected to the electronic device over a network. Examples of the network include, but are not limited to, the Internet, intranets, blockchain networks, local area networks, mobile communication networks and combinations thereof.

The electronic device may further include: an input device Y03 and an output device Y04. The processor Y01, the memory Y02, the input device Y03 and the output device Y04 may be connected through a bus or in other manners. In FIG. 7, the connection through a bus is taken as an example.

The input device Y03 may receive input numerical information or character information, and generate key signal input related to user setting and function control of the electronic device, for example, input devices such as a touch screen, a keypad, a mouse, a trackpad, a touch pad, a pointer, one or more mouse buttons, a trackball, and a joystick. The output device Y04 may include a display device, an auxiliary lighting device and a tactile feedback device (e.g., a vibration motor). The display device may include, but is not limited to, a liquid crystal display, a light-emitting diode display, and a plasma display. In some implementations, the display device may be a touch screen.

Various implementations of the systems and technologies described herein may be implemented in a digital electronic circuit system, an integrated circuit system, an application-specific integrated circuit, computer hardware, firmware, software, and/or combinations thereof. The various implementations may include: being implemented in one or more computer programs. The one or more computer programs may be executed and/or interpreted on a programmable system including at least one programmable processor. The programmable processor may be a special-purpose or general-purpose programmable processor, receive data and instructions from a storage system, at least one input device and at least one output device, and transmit the data and the instructions to the storage system, the at least one input device and the at least one output device.

The computing programs (also referred to as programs, software, software applications, or code) include machine instructions for programmable processors, and may be implemented by using high-level procedural and/or object-oriented programming languages, and/or assembly/machine languages. As used herein, the terms "machine-readable medium" and "computer-readable medium" refer to any computer program product, device, and/or apparatus (e.g., a magnetic disk, an optical disc, a memory, and a programmable logic device) configured to provide machine instructions and/or data to a programmable processor, including a machine-readable medium that receives machine instructions serving as machine-readable signals. The term "machine-readable signal" refers to any signal for providing the machine instructions and/or data to the programmable processor.

To provide interaction with a user, the systems and technologies described here can be implemented on a computer. The computer has: a display device (e.g., a cathode-ray tube or a liquid crystal display monitor) for displaying information to the user; and a keyboard and a pointing device (e.g., a mouse or trackball) through which the user may provide input for the computer. Other kinds of devices may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network, a wide area network, a blockchain network and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the traditional physical host and VPS services.

It shall be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein.

The above specific implementations do not limit the extent of protection of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the extent of protection of the present disclosure.

What is claimed is:

1. A video event recognition method, comprising:
constructing a video event graph, each event in the video event graph including: M argument roles of the event and respective arguments of the argument roles, M being a positive integer greater than one;
acquiring, for a to-be-recognized video, respective arguments of the M argument roles of a to-be-recognized event corresponding to the video; and
selecting, according to the arguments acquired, an event from the video event graph as a recognized event corresponding to the video,
wherein the selecting, according to the arguments acquired, the event from the video event graph comprises:
constructing an event graph according to the arguments acquired, the event graph comprising three layers of nodes, wherein the first layer includes one node corresponding to the to-be-recognized event, the second layer includes M nodes corresponding respectively to the argument roles, the number of nodes of the third layer is equal to a sum of the number of the arguments of the M augment roles, and the nodes of the third layer corresponds respectively to the arguments, the nodes of the second layer are connected to the node of the first layer, and the nodes of the third layer are respectively connected to the nodes of the second layer corresponding to respective argument roles to which the nodes of the third layer correspond; and
acquiring a graph embedding representation corresponding to the event graph, calculating respectively similarities between the graph embedding representation corresponding to the event graph and graph embedding representations corresponding to respective events of the video event graph, and taking the event with the maximum similarity as the recognized event,
wherein the acquiring the graph embedding representation corresponding to the event graph comprises:
selecting N center nodes from the nodes in the event graph, N being a positive integer greater than one and less than the number of the nodes comprised in the event graph;
performing the following processing on each center node: acquiring neighborhood nodes of the center node, the neighborhood nodes being nodes connected to the center node, and
determining a vector representation corresponding to a sub-graph composed of the center node and the neighborhood nodes; and
inputting the obtained vector representations into a convolutional neural network to obtain the graph embedding representation corresponding to the event graph.

2. The method according to claim 1, wherein the M argument roles comprise: a spatial scene argument role, an action argument role, a person argument role, an object argument role and a related term argument role.

3. The method according to claim 2, wherein the acquiring respective arguments of the M argument roles of the to-be-recognized event corresponding to the video comprises:
performing vision understanding on the video to obtain an argument of the spatial scene argument role, an argument of the action argument role, an argument of the person argument role and an argument of the object argument role of the to-be-recognized event; and
performing text understanding on a text corresponding to the video to obtain an argument of the related term argument role of the to-be-recognized event.

4. The method according to claim 3, wherein the performing vision understanding on the video to obtain the argument of the spatial scene argument role, the argument of the action argument role, the argument of the person argument role and the argument of the object argument role of the to-be-recognized event comprises:
performing spatial scene recognition on the video to obtain the argument of the spatial scene argument role of the to-be-recognized event; performing action recognition on the video to obtain the argument of the action argument role of the to-be-recognized event; performing face recognition on the video to obtain the argument of the person argument role of the to-be-recognized event; and performing generic object recognition on the video to obtain the argument of the object argument role of the to-be-recognized event.

5. The method according to claim 3, wherein the performing text understanding on text corresponding to the video to obtain the argument of the related term argument role of the to-be-recognized event comprises:
performing entity recognition and keyword extraction on the text to obtain the argument of the related term argument role of the to-be-recognized event.

6. The method according to claim 1, wherein the selecting N center nodes from the nodes in the event graph comprises:
taking a node corresponding to the spatial scene argument role, a node corresponding to the action argument role, a node corresponding to the object argument role and a node corresponding to the related term argument role as the center nodes.

7. The method according to claim 1, further comprising:
for each center node, if the number P of the acquired neighborhood nodes of the center node is less than K, adding K-P dummy nodes, K being a positive integer greater than one, and also taking the added dummy nodes as the neighborhood nodes of the center node; and
if the number P of the acquired neighborhood nodes of the center node is greater than K, sorting the acquired neighborhood nodes of the center node according to a predetermined rule, and discarding the K+1th neighborhood node and the neighborhood nodes thereafter after sorting.

8. An electronic device, comprising:
at least one processor; and
a memory in communication connection with the at least one processor; wherein
the memory stores instructions executable by the at least one processor, and the instructions are executed by the at least one processor to enable the at least one processor to carry out a video event recognition method, which comprises:
constructing a video event graph, each event in the video event graph including: M argument roles of the event and respective arguments of the argument roles, M being a positive integer greater than one;
acquiring, for a to-be-recognized video, respective arguments of the M argument roles of a to-be-recognized event corresponding to the video; and
selecting, according to the arguments acquired, an event from the video event graph as a recognized event corresponding to the video,
wherein the selecting, according to the arguments acquired, the event from the video event graph comprises:
constructing an event graph according to the arguments acquired, the event graph comprising three layers of nodes, wherein the first layer includes one node corresponding to the to-be-recognized event, the second layer includes M nodes corresponding respectively to the argument roles, the number of nodes of the third layer is equal to a sum of the number of the arguments of the M augment roles, and the nodes of the third layer corresponds respectively to the arguments, the nodes of the second layer are connected to the node of the first layer, and the nodes of the third layer are respectively connected to the nodes of the second layer corresponding to respective argument roles to which the nodes of the third layer correspond; and
acquiring a graph embedding representation corresponding to the event graph, calculating respectively similarities between the graph embedding representation corresponding to the event graph and graph embedding representations corresponding to respective events of the video event graph, and taking the event with the maximum similarity as the recognized event,
wherein the acquiring the graph embedding representation corresponding to the event graph comprises:
selecting N center nodes from the nodes in the event graph, N being a positive integer greater than one and less than the number of the nodes comprised in the event graph;
performing the following processing on each center node: acquiring neighborhood nodes of the center node, the neighborhood nodes being nodes connected to the center node, and
determining a vector representation corresponding to a sub-graph composed of the center node and the neighborhood nodes; and
inputting the obtained vector representations into a convolutional neural network to obtain the graph embedding representation corresponding to the event graph.

9. The electronic device according to claim 8, wherein the M argument roles comprise: a spatial scene argument role, an action argument role, a person argument role, an object argument role and a related term argument role.

10. The electronic device according to claim 9, wherein the acquiring respective arguments of the M argument roles of the to-be-recognized event corresponding to the video comprises:
performing vision understanding on the video to obtain an argument of the spatial scene argument role, an argument of the action argument role, an argument of the person argument role and an argument of the object argument role of the to-be-recognized event; and performing text understanding on a text corresponding to the video to obtain an argument of the related term argument role of the to-be-recognized event.

11. The electronic device according to claim 10, wherein the performing vision understanding on the video to obtain the argument of the spatial scene argument role, the argument of the action argument role, the argument of the person argument role and the argument of the object argument role of the to-be-recognized event comprises:

performing spatial scene recognition on the video to obtain the argument of the spatial scene argument role of the to-be-recognized event; performing action recognition on the video to obtain the argument of the action argument role of the to-be-recognized event; performing face recognition on the video to obtain the argument of the person argument role of the to-be-recognized event; and performing generic object recognition on the video to obtain the argument of the object argument role of the to-be-recognized event.

12. The electronic device according to claim 10, wherein the performing text understanding on text corresponding to the video to obtain the argument of the related term argument role of the to-be-recognized event comprises:

performing entity recognition and keyword extraction on the text to obtain the argument of the related term argument role of the to-be-recognized event.

13. The electronic device according to claim 8, wherein the selecting N center nodes from the nodes in the event graph comprises:

taking a node corresponding to the spatial scene argument role, a node corresponding to the action argument role, a node corresponding to the object argument role and a node corresponding to the related term argument role as the center nodes.

14. The electronic device according to claim 8, wherein the method further comprises:

for each center node, if the number P of the acquired neighborhood nodes of the center node is less than K, adding K-P dummy nodes, K being a positive integer greater than one, and also taking the added dummy nodes as the neighborhood nodes of the center node; and if the number P of the acquired neighborhood nodes of the center node is greater than K, sorting the acquired neighborhood nodes of the center node according to a predetermined rule, and discarding the K+1th neighborhood node and the neighborhood nodes thereafter after sorting.

15. A non-transitory computer-readable storage medium comprising instructions, which, when executed by a computer, cause the computer to carry out a video event recognition method, which comprises:

constructing a video event graph, each event in the video event graph including: M argument roles of the event and respective arguments of the argument roles, M being a positive integer greater than one;

acquiring, for a to-be-recognized video, respective arguments of the M argument roles of a to-be-recognized event corresponding to the video; and selecting, according to the arguments acquired, an event from the video event graph as a recognized event corresponding to the video, wherein the selecting, according to the arguments acquired, the event from the video event graph comprises:

constructing an event graph according to the arguments acquired, the event graph comprising three layers of nodes, wherein the first layer includes one node corresponding to the to-be-recognized event, the second layer includes M nodes corresponding respectively to the argument roles, the number of nodes of the third layer is equal to a sum of the number of the arguments of the M augment roles, and the nodes of the third layer corresponds respectively to the arguments, the nodes of the second layer are connected to the node of the first layer, and the nodes of the third layer are respectively connected to the nodes of the second layer corresponding to respective argument roles to which the nodes of the third layer correspond; and acquiring a graph embedding representation corresponding to the event graph, calculating respectively similarities between the graph embedding representation corresponding to the event graph and graph embedding representations corresponding to respective events of the video event graph, and taking the event with the maximum similarity as the recognized event, wherein the acquiring the graph embedding representation corresponding to the event graph comprises:

selecting N center nodes from the nodes in the event graph, N being a positive integer greater than one and less than the number of the nodes comprised in the event graph;

performing the following processing on each center node: acquiring neighborhood nodes of the center node, the neighborhood nodes being nodes connected to the center node, and determining a vector representation corresponding to a sub-graph composed of the center node and the neighborhood nodes; and inputting the obtained vector representations into a convolutional neural network to obtain the graph embedding representation corresponding to the event graph.

16. The non-transitory computer-readable storage medium according to claim 15, wherein the M argument roles comprise: a spatial scene argument role, an action argument role, a person argument role, an object argument role and a related term argument role.

* * * * *